United States Patent [19]
Foster, Jr.

[11] Patent Number: 5,435,583
[45] Date of Patent: Jul. 25, 1995

[54] CLUTCH OPERATED, BI-DIRECTIONAL, BICYCLE GEAR BOX

[76] Inventor: James P. Foster, Jr., 2017 Angelique St., St. Joseph, Mo. 64501

[21] Appl. No.: 65,375

[22] Filed: Aug. 9, 1993

[51] Int. Cl.$^6$ ............................................. B62M 9/04
[52] U.S. Cl. .................................. 280/237; 280/260; 74/594.2
[58] Field of Search ............... 280/236, 237, 238, 259, 280/260; 74/594.2, 594.1

[56] References Cited

U.S. PATENT DOCUMENTS

| | | | |
|---|---|---|---|
| 504,168 | 8/1893 | Morris | 280/236 |
| 587,787 | 8/1897 | Buckler | 280/238 |
| 603,326 | 5/1898 | Feingold | 280/237 |

FOREIGN PATENT DOCUMENTS

| | | | |
|---|---|---|---|
| 745409 | 5/1933 | France | 280/237 |

*Primary Examiner*—Margaret A. Focarino
*Assistant Examiner*—Kevin Hurley
*Attorney, Agent, or Firm*—Ronald C. Williams

[57] ABSTRACT

A clutch operated, bi-directional bicycle gear box assembly for forward and rearward peddling to still move the bicycle forward, comprised of: a gear box housing, the housing attached to the bicycle frame; a pair of foot pedals; a pair of crank arms; a bottom bracket spindle; a sprocket; a sprocket drive gear; a clutch subassembly, the subassembly consisting of a pair of clutch disks attached to a spacer, each clutch disk having a pair of pins; a reversing drive gear; a transfer gear, and; a shifting lever. The housing provides attachment of the components. The crank arms, attached to each pedal and to the bottom bracket spindle, transfer the pedaling motion to the bottom bracket spindle. Once the gear is in the first position, the rider can pedal forward (clockwise) in order to induce forward motion in the bicycle. With the shifting lever in the first position, the shifting lever moves the clutch subassembly into a first position, causing the pins of the first clutch disk to slide into channels in the sprocket drive gear. When the shifting lever is in the second position, the shifting lever moves the clutch subassembly to the second position, moving the second clutch disk moves into position and the connecting pins sliding into the channels of the reversing drive gear. The motion of the reversing drive gear is transferred to the sprocket by means of the transfer drive gear which is in geared connection between the reversing and the sprocket drive gears.

3 Claims, 5 Drawing Sheets

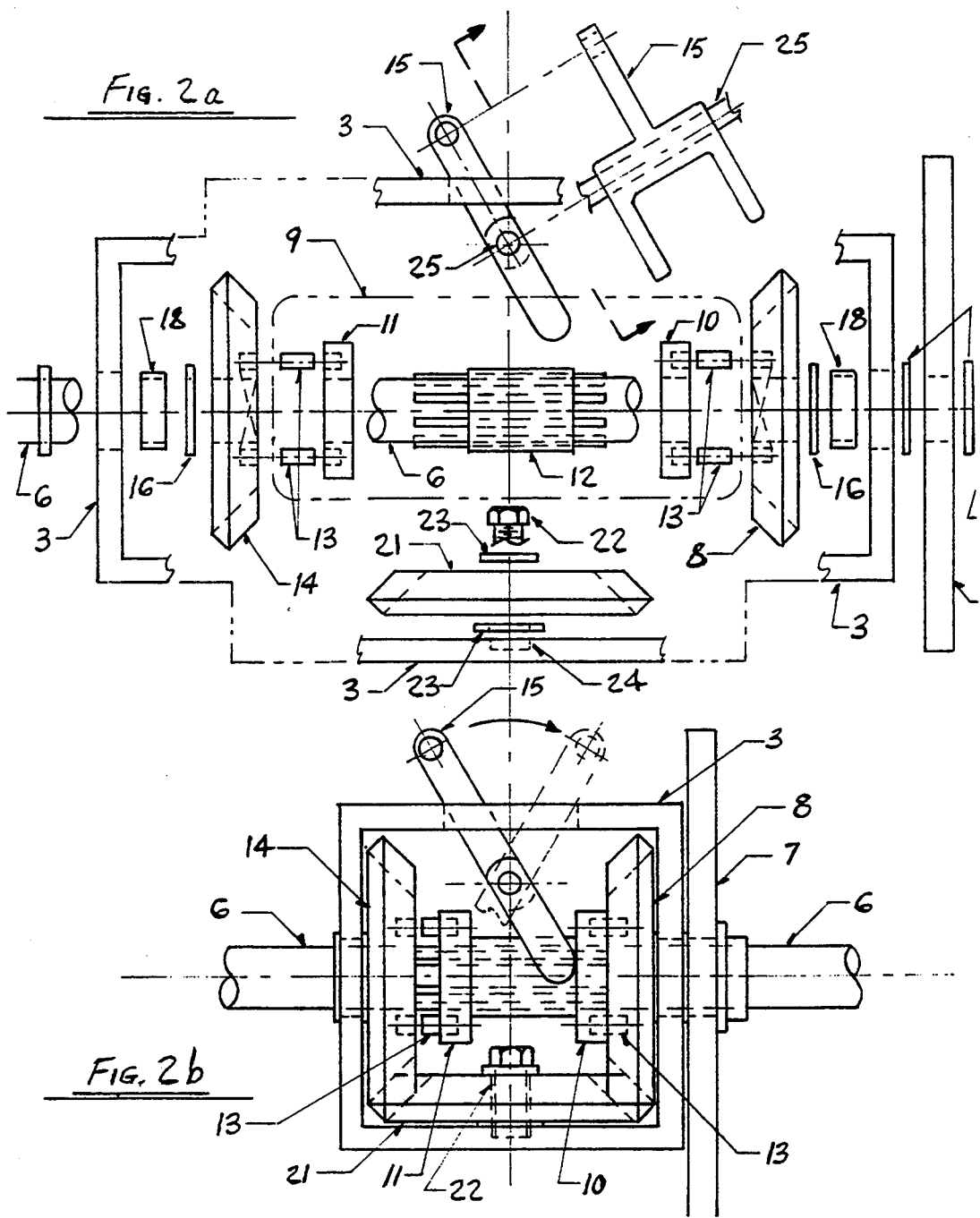

CLUTCH OPERATED, BI-DIRECTIONAL, BICYCLE GEAR BOX

BACKGROUND OF THE INVENTION

This invention relates to the field of motion transference gearing and in particular to clutch operated gear sets for transferring bicycle pedaling action from the front gear sprocket to the rear drive sprocket.

The gearing necessary to transfer the pedaling motion a rider of a bicycle into the forward motion of that bicycle is well known in the art. Such gearing has spans from the single ratio, two-sprocket system to the more recent complicated 10 & 15 derailleur systems used on many current bicycles gearing assemblies.

The very early bicycles, in their most simple design, were of direct transfer. That is, forward pedaling caused the bicycle to move in a forward direction, while rearward pedaling caused the bicycle to move in a rearward or reverse direction. This drive action was and is unsatisfactory for any number of reasons. One principal reason being that the bicycle would need to be constantly pedaling in order to continue moving forward. Also, if the rider elected to stop applying pressure to pedal the bicycle, the forward momentum of the bicycle would still cause the bicycle to move forward and the pedals to continue rotating.

To help address this problem and to provide a partial solution, gearing systems have been developed. The gearing system are used to transfer the rider's rotary pedaling motion into rear-wheel forward motion. With a two-sprocket bicycle gearing system, the pedaling action of the front drive sprocket is transferred to the rear free wheel sprocket cluster on the rear-wheel by means of a drive chain or other suitable transfer method. The teeth on the sprockets engage the openings in the chain to transfer the motion.

While this drive system was an improvement in the drive delivery, a primary advance was made with the ratcheting of the rear gearing system into the free wheel sprocket cluster, allowing the bicycle rear wheel to continue rotating forward while the forward sprocket gear and drive chain remain stationary. This system still allows the drive chain to impart forward motion to move the bicycle in a forward direction by forward pedaling.

In the prior art gear systems, the braking mechanism is usually located in the rear axle bearing assembly. In this style of bicycle, moving the pedal in a "backward" would engage the rear brake thereby stopping the rear wheel rotation and the bicycle forward motion. With multi-gear bicycles, the braking is usually done by hand brakes which engage pads that apply pressure to the rim of the tire thereby stopping the bicycle. On these bicycles, rearward pedaling is free-action, neither engaging a braking system or causing the bike to move in a rearward direction.

These basic designs have been well known in the arts for decades. However, significant work has nonetheless gone into the design of more efficient and smoother gear-shift mechanisms, shifting systems, and design of sprocket and chain meshing.

For example, with a two-sprocket system, the gearing is set in the mid-range for average operation. However, for ease of pedaling, multi-gears are used to step up or down the rider's pedaling motion. With multi-gear bicycling systems, the gears allow for a wide-range of pedaling forces. This provides easier initial pedaling prior to the build-up of momentum and for greater relative distance of travel once momentum and speed have been achieved. Traditionally, such multi-gear bicycles have two gears of different diameters on the front sprocket and five on the rear axle. Shifting is accomplished by a set of guides which laterally move the chain between adjacent gears.

All of the presently available systems have one thing in common. That is, the bicycle is adapted such that the drive gears are engaged for forward motion when the rider pedals in a "forward" direction. By forward, it is meant that when the pedal is in its upper-most position, that pedal must be pushed in a forward and a downward direction in order for the bicycle to go forward. However, all of the previously recited gearing systems have a single point in common. That is, that the gearing is arranged such that the bicycle will be moved in a forward direction when pedaling is in a forward direction, but that no forward movement is created by rearward pedaling. With either gearing mechanism, when the bicycle is in forward motion, the bicycle will continue in said motion when the pedaling is stopped and the rear wheel is allowed to ratchet with regard to the rear sprocket gear.

Having established same, it is understood that bicycling provides excellent exercise opportunities. Accordingly, bicycling for exercising and recreation has enjoyed popular support for both recreation, sports, and practical travel purposes. Forward pedaling provides the rider with much needed exercise opportunities.

It should be noted that advantageously, a different set of muscles are used in rear pedaling. Thus for a full exercise routine, for complete rehabilitation of the leg muscles, or to delay the onset of fatigue, a system that would allow both front and back pedaling would be desireable. The present invention provides just that ability.

There is no reason why mechanically the rider could not pedal backwards and still have the bicycle engaged in forward motion. Tradition and the normal anatomical arrangement has generally resulted in the forward pedaling to generate forward motion. However, because there is no mechanical reason for pedaling backwards, there is no reason why same can not be accomplished. Nonetheless because the tradition is to pedal forward, there have not be any bicycling systems established which allow for forward motion with pure backward pedaling.

It should be understood however: that "backward pedaling" will also provide the rider with advantageous exercise opportunities and in fact the rearward pedaling causes the riders to use a different set of muscles that are ordinary used then when pedaling in a forward direction. This fact has been used on several exercise bicycles which allow for resistance to motion in both the forward and rearward pedaling motion. However, to date the ability to pedal forward and backward with the same bicycle traveling in a forward direction has not been available. It is for this purpose that the present invention is directed.

What is needed therefore is a bicycle gearing system which will allow the bicycle to maintain forward motion while selectively pedaled in either a forward or in a rearward direction.

It is the objective of this invention to allow forward motion of the bicycle when the bicycle is pedaling in a rearward direction.

It is another objective of this invention to allow forward motion of the bicycle when the bicycle is selectively pedaling in a forward or rearward direction.

BRIEF SUMMARY OF THE INVENTION

The disclosed invention, a clutch operated, bi-directional cycle gear box assembly, is a forward and rearward pedaling gear assembly which allows the rider to selectively pedal forward or rearward and still move the bicycle in a forward direction. That is, when the rider pedals in a forward, the gearing assembly will allow the forward pedaling motion to move the bicycle in a forward direction. But that when alternative gears are engaged, when the rider pedals in the untraditional backward direction, the gearing assembly will still allow the pedaling motion to move the bicycle in that forward direction. As with the traditional bicycle, the gearing assembly is placed at the mid section of the bicycle frame where the sprocket assembly is normally placed.

The disclosed invention, a clutch operated, bi-directional bicycle gear box assembly, is a forward and rearward pedaling gear assembly which allows the rider to selectively pedal forward or rearward and still move the bicycle in a forward direction. That is, when the rider pedals in a forward, the gearing assembly will allow the forward pedaling motion to move the bicycle in a forward direction. But that when alternative gears are engaged, when the rider pedals in the untraditional backward direction, the gearing assembly will still allow the pedaling motion to move the bicycle in that forward direction. For ease of understanding, in this specification forward rotation is clockwise rotation as viewed from the right side of the bicycle as the bicycle moves from left to right.

In the preferred embodiment, the bi-direction gear box assembly, said gear box assembly drive components for driving a single drive chain are comprised of: a gear box housing, said housing attached to the frame of the bicycle and providing containment and attachment of the remaining components of the gear box assembly; a left and a right foot pedal; a left and a right crank arm; a bottom bracket spindle; a sprocket; a sprocket drive gear; a clutch subassembly, the subassembly consisting of a pair of clutch disks disposed between and fixedly attached to a spacer, each clutch disk in turn having a pair of outward projecting connecting pins; a secondary reversing drive gear; a transfer gear, and; a shifting lever.

As with the traditional bicycle, the gear box assembly is attached at the mid section of the bicycle frame where the sprocket assembly is normally placed. The housing provides containment and attachment of the components of the gear box assembly. As with a traditional bicycle, the rider provides the motive means for bicycle operation by applying successive force to the left and right foot pedals.

Each pedal is attached to its respective crank arm. The left crank arm, with one end connected to the left foot pedal, has the second end connected to one end of the bottom bracket spindle. The right crank arm likewise, with one end connected to the right foot pedal, has the second end connected to the other end of the bottom bracket spindle.

The crank arms, attached to each pedal and to the bottom bracket spindle, transfer the rotary motion of the pedaling to the bottom bracket spindle. The bottom bracket spindle axis of rotation passes through the central axis of the clutch subassembly. The bottom bracket spindle rotary motion rotates the clutch subassembly which is comprised of a first and a second clutch disk fixedly attached to the spacer, all of which are mounted for free rotation, around the bottom bracket spindle.

When the shifting lever is in the first position, the gear assembly is set for forward pedaling motion. Once the gear is in the first position, the rider can pedal forward (clockwise) in order to induce forward motion in the bicycle. With the shifting lever in the first position, the shifting lever moves the clutch subassembly to the first position such that the first clutch disk moves into a first position that causes the pins of the first clutch disk to slide into the channels of the sprocket drive gear as the clutch subassembly rotates.

The sprocket drive gear has a pair of slots that taper from being flush with the surface of the sprocket drive gear to form a channel into which the pins on the clutch disks can slide as the clutch disk rotates. The channels taper to an end point which cooperate with the pins to cause the sprocket drive gear to be rotated in a forward direction along with the bottom bracket spindle. As the first clutch disk rotates, the pins travel down the slope of the channels to come into contact with end the channels. Once the pins reach the end of the channels, the pins engage the end of the channel, thereby causing the sprocket drive gear to rotate along with the bottom bracket spindle.

The sprocket drive gear is positioned to rotate coaxial to and independently around the bottom bracket spindle, and is held in position around the bottom bracket spindle by a pair of bearings placed on either end of the interior passage of the sprocket drive gear. Thus, the forward motion of the sprocket is directly tied to the drive sprocket gear, as the sprocket drive gear is fixedly attached to the sprocket. As the sprocket rotates in the forward direction, the drive chain transfers forward motion to the rear sprocket for the forward movement of the bicycle.

When, the first clutch disk in position to engage the channels in the sprocket drive gear, the sprocket drive gear moves the bicycle forward. However, if the rider then pedals in a rearward direction, the pins will rotate out of the channels and thereafter will spin against the sprocket driving gear. However since the taper of the channels do not provide an end wall for the pins to engage, the first clutch disk will spin freely without causing the sprocket drive gear to also rotate in the rearward direction with the clutch subassembly.

Moving now to rearward pedaling for forward movement of the bicycle, when the shifting lever is in the second position, the gear assembly is set for rearward pedaling motion. Once the gear is in the second position, the rider then pedals rearward in order to induce forward motion in the bicycle. With the shifting lever in the second position, the shifting lever moves the clutch subassembly to the second position such that the second clutch disk moves into position so that the pins will slide into the channels of the reversing gear as the clutch rotates and engage the wall of the channels once the pins reach the end of the channels. Once the pins reach the end of their respective channels, the pins engage the end of the channels, causing the reversing gear to rotate in a counter clockwise direction along with the bottom bracket spindle. Once engaged, the reversing gear transfers its rotary motion to the transfer gear. The transfer gear in turn transfers its rotary motion to the sprocket drive gear, which in this instance rotates in a forward direction.

As with the sprocket drive gear, when the clutch subassembly is in the second position, the second clutch disk in position to engage the channels in the reversing gear, but if the rider then pedals in a forward direction, the pins will rotate out of the channels and thereafter will spin against the reversing gear. However since the taper of the channels do not provide an end wall for the pins to engage, the clutch disk will spin freely without causing the revering gear to also rotate in the rearward direction with the clutch subassembly. The present invention therefor advantageously allows the use of a single drive chain to accomplish the forward motion transfer whether the rider is pedaling in a forward or a rearward direction.

BRIEF DESCRIPTION OF THE DRAWING

FIG. 2a is a pictorial representation of the disclosed invention, a bi-directional bicycle gear box assembly, showing each major element of the invention.

FIG. 2b is a schematic representation of the disclosed invention, a bi-directional bicycle gear box assembly, showing each major motion transmitting element of the invention with the gearing in the first position and geared for forward pedaling.

DETAILED DESCRIPTION OF THE PREFERRED EMBODIMENT

Figure 1A:
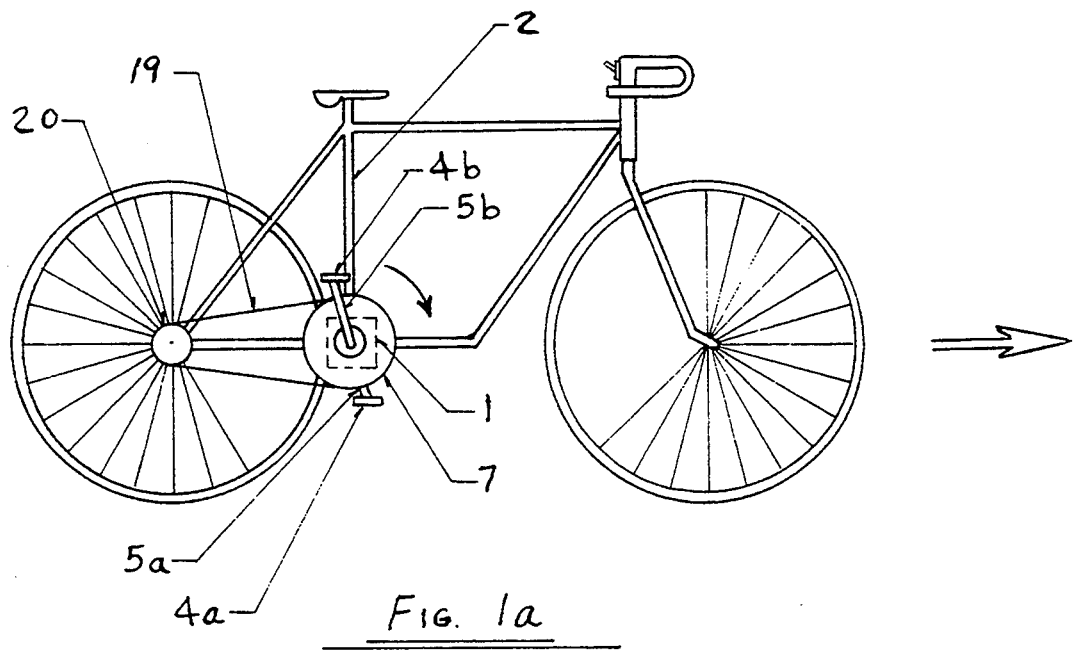
FIG. 1a is pictorial representation of the disclosed invention, a bi-directional bicycle gear box assembly, where the assembly is attached on the traditional bicycle, and further showing the forward motion of the bicycle as the bicycle is pedaled in the traditional forward direction.

As shown in FIGS. 1a, 1b, 2a and 2b, in the preferred embodiment, a clutch operated, bi-directional bicycle gear box assembly 1, the disclosed invention is a gear box assembly 1, which allows the rider to selectively pedal forward or rearward and still move the bicycle in a forward direction. That is, when the rider pedals in a forward, the gearing assembly 1 will allow the forward pedaling motion to move the bicycle 2 in a forward direction. But that when alternative gears are engaged, when the rider pedals in the untraditional backward direction, the gear box assembly 2 will still allow the pedaling motion to move the bicycle in that forward direction. As with the traditional bicycle, the gear box assembly 1 is placed at the mid section of the bicycle frame 2 where the sprocket assembly is normally placed. For ease of understanding, in this specification forward rotation is clockwise rotation as viewed from the right side of the bicycle as the bicycle moves from left to right.

In the preferred embodiment, the bi-direction gear box assembly 1, is comprised of: a gear box housing 3, said housing 3 attached to the bicycle frame 2 and providing containment and attachment of the remaining components of the gear box assembly 1; a left and a right foot pedal 4a an 4b; a left and a right crank arm 5a and 5b; a bottom bracket spindle 6; a sprocket 7; a sprocket drive gear 8; a clutch subassembly 9, the subassembly consisting of a pair of clutch disks 10 and 11 disposed between and fixedly attached to a spacer 12, each clutch disk 10 and 11 in turn having a pair of outward projecting connecting pins 13; a reversing drive gear 14; a transfer drive gear 21, and; a shifting lever 15.

As shown in FIGS. 1 and 2, the gear box assembly 1 is attached at the mid section of the bicycle frame 2 where the sprocket assembly is normally placed. The housing 3 provides containment and attachment of the components of the gear box assembly 1. As with a traditional bicycle, the rider provides the motive means for the bicycle 2 operation by applying successive force to the left and right foot pedals 4a and 4b.

Figure 1B:
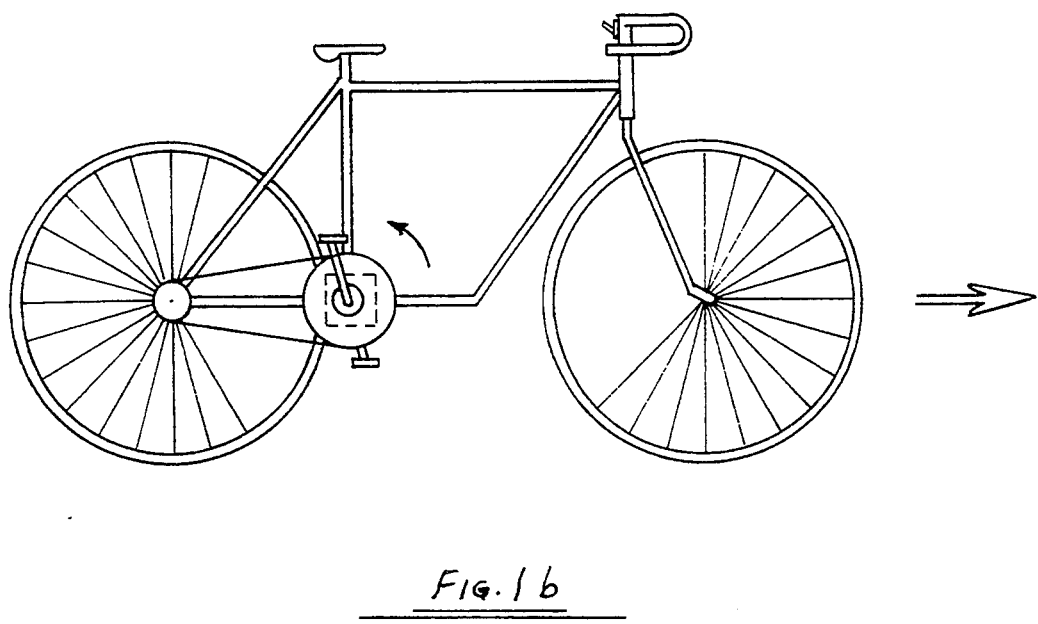
FIG. 1b is pictorial representation of the disclosed invention, a bi-directional bicycle gear box assembly, showing the forward motion of the bicycle as the bicycle is pedaled in the rearward direction as disclosed in the present invention.

As shown in FIGS. 1a and 1b, each pedal 4a and 4b is attached to its respective crank arm 5a and 5b. The left crank arm 5a, with one end connected to the left foot pedal 4a, has the second end connected to one end of the bottom bracket spindle 6. The right crank arm 5b likewise, with one end connected to the right foot pedal 4b, has the second end connected to the other end of the bottom bracket spindle 6.

The crank arms 5a and 5b, attached to each pedal 4a and b and to the bottom bracket spindle 6, transfer the rotary motion of the pedaling to the bottom bracket spindle 6, causing the bottom bracket spindle 6 to rotate in the same direction as the pedaling force applied. The bottom bracket spindle 6 axis of rotation passes through the central axis of the clutch subassembly 9. The clutch subassembly 9 is fixedly attached to the bottom bracket spindle 6 so that the subassembly 9 rotates with the spindle 6 in either the clockwise or the counter clockwise direction.

As shown in FIG. 2a, the bottom bracket spindle 6 and the clutch subassembly 9 are slidably mounted to the frame 2 by means of a series of washers 16 which retain the bottom bracket spindle 6 in place on the housing 2, and allow the bottom bracket spindle 6 to freely translate transversely relative to the bicycle frame 2 when the shifting lever 15 is activated. As shown in FIG. 2a, the shifting lever 15 is rotatably fastened by means of a retaining finger 25 to the frame 2 so as to allow the lever 15 to move from a first position for forward pedaling action to a second position for rearward pedaling action.

As shown in FIG. 2b, when the shifting lever 15 is in a first position, the gear assembly 1 is set for forward pedaling motion. With the shifting lever 15 in the first position, the shifting lever 15 moves the clutch subassembly 9 to the first position such that, as the clutch subassembly 9 rotates, the first clutch disk 10 moves into a first position that causes the pins 13 of the first clutch disk 10 to slide into the channels 17 of the sprocket drive gear 8.

Figure 4:
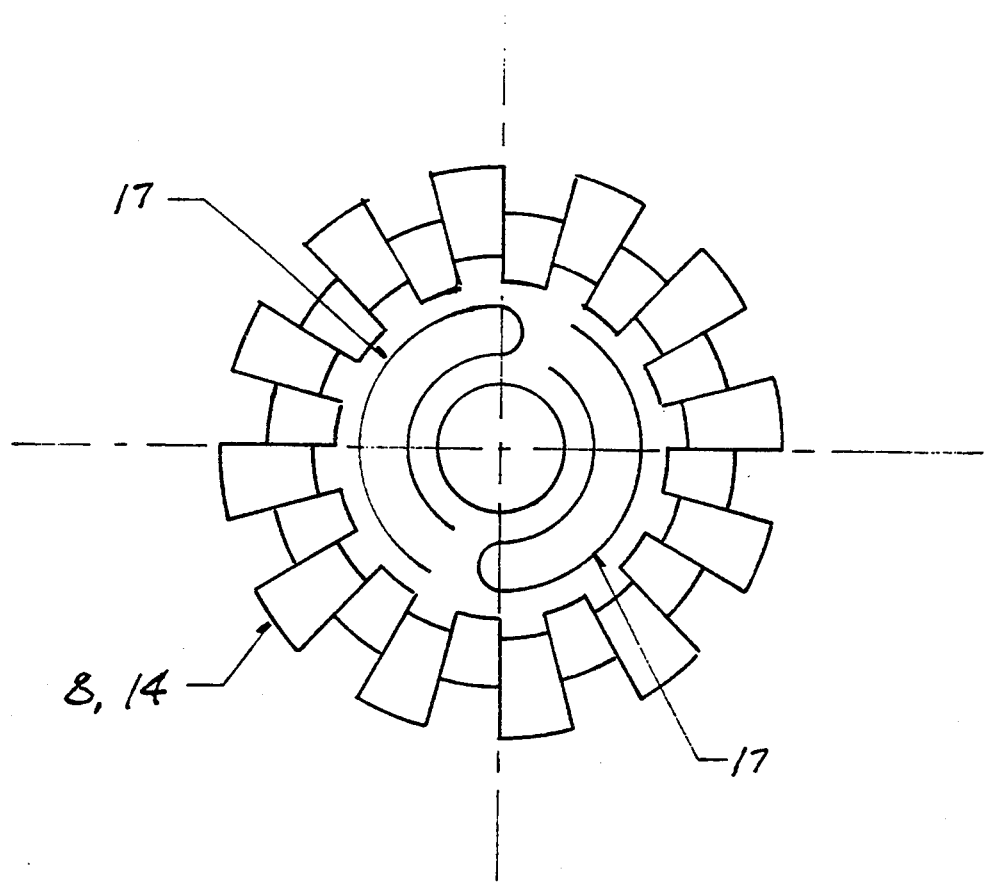
FIG. 4 is a pictorial representation of the disclosed invention, a bi-directional bicycle gear box assembly, showing the tapered channels in the clutch disk.

As shown in FIG. 4, the sprocket drive gear 8 has a pair of tapered channels 17 that slope from being flush with the surface of the sprocket drive gear 8 to form a slot into which the pins 13 on the clutch disks 10 can slide as the clutch disk 10 rotates. The channels 17 taper to an end point which cooperate with the pins 13 to cause the sprocket drive gear 8 to be rotated in a forward direction along with the bottom bracket spindle 6.

As the first clutch disk 10 rotates, the pins 13 travel down the slope of the channels 17 to come into contact with end the channels 17. Once the pins 13 reach the end of the channels 17, the pins 13 engage the end of the channel 13, thereby causing the sprocket drive gear 8 to thereafter be rotated along with the bottom bracket spindle 6.

Figure 3:
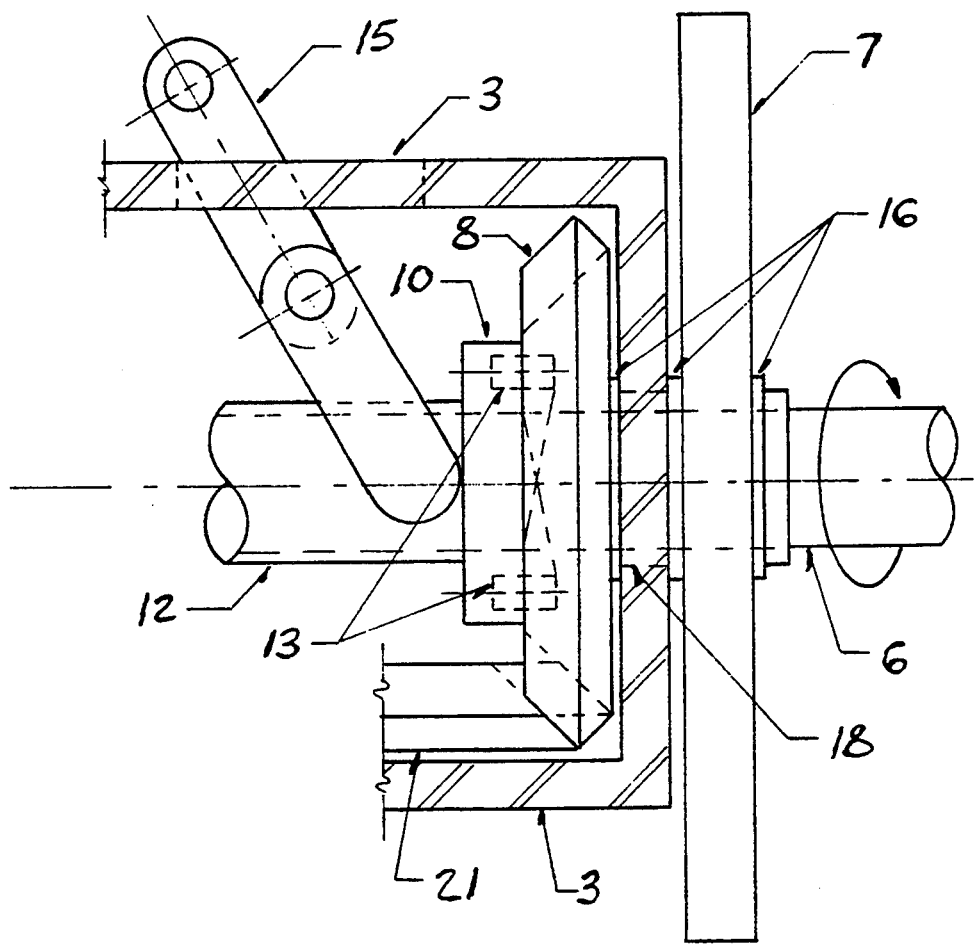
FIG. 3 is a schematic representation of the disclosed invention, a bi-directional bicycle gear box assembly, showing each major motion transmitting element of the invention with the gearing in the second position and geared for backward pedaling.

As shown in FIG. 3, the sprocket drive gear 8 is positioned to rotate coaxial to and independently around the bottom bracket spindle 6, and is held in position around the bottom bracket spindle 6 by a pair of bearings 18 placed on either end of the interior passage of the sprocket drive gear 8 between the sprocket drive gear 8 and the housing 3. Thus, the forward motion of the sprocket 7 is directly tied to the sprocket drive gear 8, as the sprocket drive gear 8 is fixedly attached to the sprocket 7. Then, as the sprocket 7 rotates in the forward or clockwise direction, the single drive chain 19 transfers forward motion to the rear free wheel sprocket 20 for the forward movement of the bicycle.

With the gear box assembly 1 is in the first position, the rider can pedal forward (clockwise) in order to induce forward motion in the bicycle 2. When, as can be seen in FIG. 2b, the first clutch disk 10 in position to engage the channels 17 in the sprocket drive gear 8, the sprocket drive gear 8 moves the bicycle 2 forward. However, if the rider pedals instead a rearward or counter clockwise direction or stops pedaling while the bicycle is still in forward motion, the pins 13 will rotate out of the channels 17 and thereafter will spin freely relative to the sprocket driving gear 8, since the taper of the channels 17 do not provide an end wall for the pins 13 to engage. Thus, the first clutch disk 10 will spin freely without causing the sprocket drive gear 8 to also rotate with the clutch subassembly 9.

Figure 5:
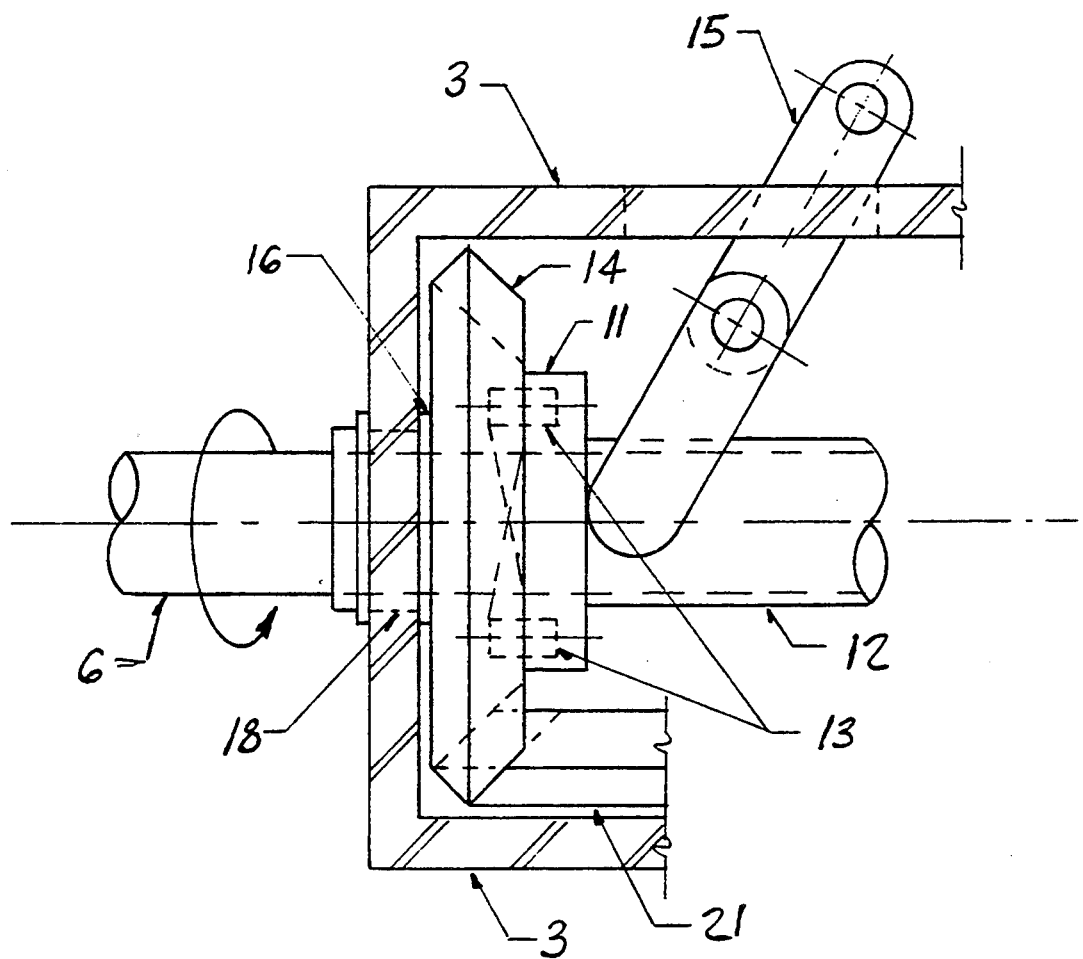
FIG. 5 is a schematic representation of the disclosed invention, a bi-directional bicycle gear box assembly, showing major motion transmitting element of the invention with the gearing in a second position and geared for rearward pedaling.

Moving now to rearward pedaling for forward movement of the bicycle, as shown in FIGS. 2b and 5, when the shifting lever is in the second position, the gear box assembly 1 is set for rearward or counter clockwise pedaling motion. Once the gear box assembly 1 is in the second position, the rider then pedals rearward in order to induce forward motion in the bicycle.

As shown in FIGS. 3 and 5, with the shifting lever 15 in the second position, the shifting lever 15 moves the clutch subassembly 9 to the second position such that the second clutch disk 11 moves into position so that the pins 13 will slide into the channels 17 of the reversing drive gear 14 as the clutch subassembly 9 rotates and engage the walls of the channels 17 once the pins 13 reach the end of the channels 17. Once the pins 13 reach the end of their respective channels 17, the pins 13 engage the end of the channel 17, causing the reversing drive gear 14 to rotate in a counter clockwise direction along with the bottom bracket spindle 6.

As shown in FIG. 5, the reversing drive gear 14 is positioned to rotate coaxial to and independently around the bottom bracket spindle 6, and is held in position around the bottom bracket spindle by a pair of bearings 18 placed on either end of the interior passage of the reversing drive gear 14 between the reversing drive gear 14 and the housing 3.

As shown in FIG. 5, once engaged, the reversing drive gear 14 transfers its rotary motion to the transfer drive gear 21. The transfer gear 21 is fastened to the housing 3 for free rotation by means of bolt 22 and washers 23. The bolt 22 fastens into threaded recess 24 in the housing 3 and secures the transfer drive gear 21 in place. The transfer drive gear 21 in turn transfers its rotary motion to the sprocket drive gear 8, which in this instance rotates again in a forward direction, but this time as a result of the force supplied by the transfer drive gear 21.

As shown in FIGS. 2 and 5, with the sprocket drive gear 8, when the clutch subassembly 9 is in the second position, the second clutch disk 11 in position to engage the channels 17 in the reversing drive gear 15, but if the rider then pedals in a forward direction, the pins 13 will rotate out of the channels 17 and thereafter will spin freely relative to the reversing drive gear 14. However since the taper of the channel 17 does not provide an end wall for the pins 13 to engage the second clutch disk 11 will spin freely without causing the reversing drive gear 14 to also rotate in the rearward direction with the clutch subassembly 9. It can be seen therefore that the with the preferred embodiment of the disclosed invention, a single drive chain 19 can be utilized to provide for the forward motion transfer from the bottom bracket spindle 6 to the rear free wheel sprocket 20 whether the rider pedals in a forward or a rearward direction.

It should be noted that the housing 3 can be advantageously secured to the frame by any number of well known conventional means. The present invention contemplates fastening the housing 3 to the frame permanently by attachment during manufacture of the bicycle or as an add-on component that has fastening made which allow the assembly to be secured to the frame 2 after manufacture. Because such fastening means are well known in the art, they are not recited herein, but as well known general technology are incorporated by reference.

The present invention has been disclosed in the preferred embodiment. However, such disclosure was illustrative in nature and in no sense is intended to limit the scope and coverage of the invention. It should be understood that the present invention is intended to include all alternative embodiments of the disclosed invention, including application to stationary bicycle, which in fact have no forward motion, but which can effectively make use of the embodiments disclosed herein.

I claim:

1. A forward and rearward pedaling, clutch operated, bicycle gear box assembly for forward and backward rider pedaling, both pedaling motions moving a bicycle in a forward direction, said gear box assembly placed at a midsection position of a bicycle frame where a front sprocket assembly is normally placed, said gear box assembly comprised of:

means for containment or attachment of said bicycle gear box assembly to the bicycle frame;

means for bi-directional pedaling which selectively moves the bicycle in a forward direction;

a front sprocket for transfer of rotary motion of the gear box assembly to a rear free wheel sprocket;

a rear free wheel sprocket, said rear free wheel sprocket attached on a hub of a rear wheel of the bicycle; and a single drive chain, said single drive chain looped around the front sprocket and the rear free wheel sprocket for transfer of the rotation of the front sprocket to the rear free wheel sprocket.

2. A forward and rearward pedaling, clutch operated, bicycle gear box assembly for forward and backward rider pedaling, as recited in claim 1, wherein the means for containing said bicycle gear box assembly is comprised of a housing, said housing providing containment for or attachment of the components of said gearing arrangement.

3. A forward and rearward pedaling, clutch operated, bicycle gar box assembly for forward and backward rider pedaling, as recited in claim 2, wherein the means for bi-directional pedaling which selectively moves the bicycle in a forward direction is comprised of:

- a left and a right foot pedal, for riders to provide the force for gear operation;
- a left and a right crank arm, said crank arms each having one end connected to the respective foot pedal and a second end connected to a bottom bracket spindle;
- a bottom bracket spindle, said bottom bracket spindle forming an axle for transmitting the rotary motion of the pedals and crank arms to a clutch subassembly;
- a clutch subassembly, said clutch subassembly comprising a pair of clutch disks disposed between, and fixedly attached, to a spacer, each clutch disk in turn having a pair of outward projecting pins, the clutch subassembly fixedly attached to the bottom bracket spindle for fixed rotation with the bottom bracket spindle;
- a front sprocket drive gear, said front sprocket drive gear rotatably fastened to the housing for free rotation around the bottom bracket spindle, with said front sprocket drive gear fastened to the sprocket for rotation of the sprocket with the front sprocket drive gear, said front sprocket drive gear having a pair of tapered channels into which the pins of the first clutch disk can be inserted;
- a reversing drive gear, said reversing drive gear rotatably fastened to the housing for free rotation around the bottom bracket spindle, said reversing drive gear having a pair of tapered channels into which the pins of the second clutch disk can be inserted;
- a transfer drive gear, said transfer drive gear rotatably fastened to the housing and in contact with the reversing drive gear and the front sprocket drive gear for the transfer of rotation motion from the reversing drive gear to the front sprocket drive gear, and;
- a shifting lever, said shifting lever rotatably fastened to the bicycle frame so as to allow the shifting lever to move from a first position for forward pedaling action to a second position for rearward pedaling action, such that with the shifting lever in the first position, the shifting lever moves the clutch subassembly to the first position such that the first clutch disk moves into a first position that causes the pins of the first clutch disk to slide into the channels of the front sprocket drive gear as the clutch subassembly rotates and the front drive sprocket gear in turn rotates the sprocket, and further when moved to a second position for rearward pedaling, the shifting lever moves the clutch subassembly to the second position such that the second clutch disk moves into a position that causes the pins of the second clutch disk to slide into the channels of the reversing drive gear as the clutch subassembly rotates, causing the reversing drive gear to turn the transfer gear, and the transfer gear in turn rotating the front sprocket drive gear.

* * * * *